United States Patent
Wu et al.

(10) Patent No.: US 11,050,575 B2
(45) Date of Patent: Jun. 29, 2021

(54) ENTANGLEMENT AND RECALL SYSTEM USING PHYSICALLY UNCLONABLE FUNCTION TECHNOLOGY

(71) Applicant: eMemory Technology Inc., Hsin-Chu (TW)

(72) Inventors: Meng-Yi Wu, Hsinchu County (TW); Chih-Min Wang, Hsinchu County (TW); Hsin-Ming Chen, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 260 days.

(21) Appl. No.: 16/223,184

(22) Filed: Dec. 18, 2018

(65) Prior Publication Data

US 2019/0215167 A1  Jul. 11, 2019

Related U.S. Application Data

(60) Provisional application No. 62/615,463, filed on Jan. 10, 2018.

(30) Foreign Application Priority Data

Oct. 11, 2018  (TW) .................................. 107135832

(51) Int. Cl.
  *H04L 9/32*  (2006.01)
  *H04L 9/06*  (2006.01)
  *H04L 9/08*  (2006.01)

(52) U.S. Cl.
  CPC .......... *H04L 9/3278* (2013.01); *H04L 9/0618* (2013.01); *H04L 9/0866* (2013.01)

(58) Field of Classification Search
  CPC .... H04L 9/3278; H04L 9/0618; H04L 9/0866
  See application file for complete search history.

(56) References Cited

U.S. PATENT DOCUMENTS

| 9,613,714 B1 | 4/2017 | Wong et al. |
| 9,864,654 B2 | 1/2018 | Vishne et al. |

(Continued)

FOREIGN PATENT DOCUMENTS

| JP | H1-122227 | 5/1989 |
| JP | 2017-130184 | 7/2017 |
| WO | WO2010134192 | 11/2010 |

OTHER PUBLICATIONS

Office Action dated Oct. 29, 2019, issued by JPO.

(Continued)

*Primary Examiner* — Kevin Bechtel
*Assistant Examiner* — Sangseok Park
(74) *Attorney, Agent, or Firm* — WPAT, PC (57) ABSTRACT

An entanglement and recall system includes an antifuse-type PUF cell array and a processing circuit. The antifuse-type PUF cell array generates at least one key. The processing circuit is connected with the antifuse-type PUF cell array to receive the at least one key. While an entanglement action is performed, the processing circuit receives a plain text and the at least one key and generates a cipher text according to the plain text and the at least one key. While a recall action is performed, the processing circuit receives the cipher text and the at least one key and generates the plain text according to the cipher text and the at least one key.

10 Claims, 7 Drawing Sheets

(56) References Cited

U.S. PATENT DOCUMENTS

| | | |
|---|---|---|
| 2013/0339753 A1* | 12/2013 | Shibutani ............... G09C 1/00 |
| | | 713/189 |
| 2016/0254041 A1 | 9/2016 | Andre |
| 2017/0083402 A1 | 3/2017 | Vishne et al. |
| 2017/0200508 A1 | 7/2017 | Grigoriev et al. |
| 2017/0288869 A1 | 10/2017 | Li et al. |
| 2019/0207745 A1* | 7/2019 | Si ........................ H04L 9/0894 |

OTHER PUBLICATIONS

Ikeno, Shinichi, "Modem Cryptography Theory",Nov. 15, 1997, p. 54-56, The Institute of Electronics, Information and Communication Engineers.
Taiwan Patent Office "Office Action" dated Jan. 8, 2019, Taiwan.
Search report issued by EPO dated May 22, 2019.

\* cited by examiner

ENTANGLEMENT AND RECALL SYSTEM USING PHYSICALLY UNCLONABLE FUNCTION TECHNOLOGY

This application claims the benefit of U.S. provisional application Ser. No. 62/615,463, filed Jan. 10, 2018 and Taiwan Patent Application No. 107135832, filed Oct. 11, 2018, the subject matters of which are incorporated herein by reference.

FIELD OF THE INVENTION

The present invention relates to a system, and more particularly to an entanglement and recall system using a physically unclonable function (PUF) technology.

BACKGROUND OF THE INVENTION

A physically unclonable function (PUF) technology is a novel method for protecting the data in an integrated circuit (IC) chip. That is, the use of the PUF technology can prevent the data of the IC chip from being stolen. In accordance with the PUF technology, the IC chip is equipped with a random code generator for providing a random code. The random code is a unique identity code (ID code) of the IC chip.

Generally, the PUF technology acquires the unique random code of the IC chip according to the manufacturing variation of the IC chip. This manufacturing variation includes the process variation of the IC chip. That is, even if the PUF IC chip is produced by a precise manufacturing process, the random code cannot be duplicated.

In other words, even if two IC chips are produced by the same manufacturing process, the ID codes are not completely identical. Consequently, the PUF IC chip is suitably used in the applications with high security requirements.

Moreover, U.S. Pat. No. 9,613,714 disclosed a one time programming memory cell and a memory array for a PUF technology and an associated random code generating method. The one time programming memory cell is also referred as an OTP memory cell.

Due to the process variation of an antifuse-type OTP memory cell, the storage state of the programmed OTP memory cell cannot be predicted. Consequently, one bit of a random code can be determined according to the storage state of the programmed OTP memory cell. The OTP memory cell using the PUF technology is referred as an antifuse-type PUF cell, and the OTP memory cell array using the PUF technology is referred as an antifuse-type PUF cell array.

After the antifuse-type PUF cell array is produced and subjected to a program action, a multi-bit random code is recorded in the antifuse-type PUF cell array. According to the PUF technology, the program action is also referred as an enrollment action. In case that the antifuse-type PUF cell is programmed, the antifuse-type PUF cell is enrolled.

SUMMARY OF THE INVENTION

An embodiment of the present invention provides an entanglement and recall system. The entanglement and recall system includes an antifuse-type PUF cell array and a processing circuit. The antifuse-type PUF cell array generates at least one key. The processing circuit is connected with the antifuse-type PUF cell array to receive the at least one key. While an entanglement action is performed, the processing circuit receives a plain text and the at least one key and generates a cipher text according to the plain text and the at least one key. While a recall action is performed, the processing circuit receives the cipher text and the at least one key and generates the plain text according to the cipher text and the at least one key.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
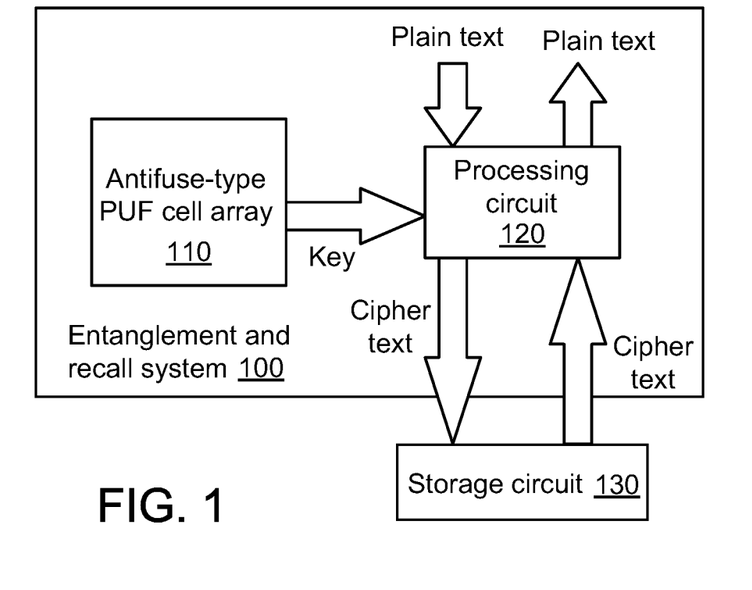
FIG. 1 is a schematic block diagram illustrating the concepts of an entanglement and recall system according to an embodiment of the present invention.

The present invention provides an entanglement and recall system using a physically unclonable function (PUF)

technology. FIG. 1 is a schematic block diagram illustrating the concepts of an entanglement and recall system according to an embodiment of the present invention. The entanglement and recall system 100 is installed in an integrated circuit chip (IC chip). The entanglement and recall system 100 comprises an antifuse-type PUF cell array 110 and a processing circuit 120. In this embodiment, the antifuse-type PUF cell array 110 has been enrolled.

While an entanglement action and a recall action are performed, the antifuse-type PUF cell array 110 issues a key to the processing circuit 120.

While the entanglement action is performed, the processing circuit 120 receives a plain text and the key and generates a cipher text. The cipher text can be stored in a storage circuit 130. An example of the storage circuit 130 includes but is not limited to a non-volatile memory or a hard disk. In another embodiment, the storage circuit 130 is included in the entanglement and recall system 100.

While the recall action is performed, the processing circuit 120 receives the cipher text from the storage circuit 130. Then, the processing circuit 120 generates the plain text according to the cipher text and the key.

In an embodiment, the antifuse-type PUF cell array 110 comprises plural antifuse-type OTP memory cells. Due to the process variation, the storage state of the enrolled antifuse-type OTP memory cell in the antifuse-type PUF cell array 110 cannot be predicted. Consequently, the antifuse-type PUF cell array 110 in the IC chip can provide the unpredictable and unique key to the processing circuit 120.

Since the key of the entanglement and recall system 100 is generated by the antifuse-type PUF cell array 110 in the IC chip, the content of the key cannot easily leaked out of the IC chip. Consequently, even if the cipher text from the storage circuit 130 is acquired, the external device cannot realize the generated key of the antifuse-type PUF cell array 110. Under this circumstance, the cipher text cannot be cracked.

In other words, when a cipher text is generated by the antifuse-type PUF cell array 110 of a specified IC chip, a plain text can be recalled by the IC chip only. Other IC chips with the structure similar to the specified IC chip cannot recall the plain text from the cipher text that is generated by the specified IC chip because the content of the key is different.

In an exemplified embodiment, a factory key and public/private keys are transmitted to the end user for the purpose of authentication by hardware security modules (HSMs). However, the private key (plain text) may be processed firstly by the entanglement and recall system 100. A cipher text is then outputted as an activation code. In this way, the factory key, the activation code and the public key are transmitted to the end user for follow-up authentication. That is to say, the activation code (cipher text) instead of the private key (plain text) is transmitted so that the transmitted path may be more secure.

Figure 2A:
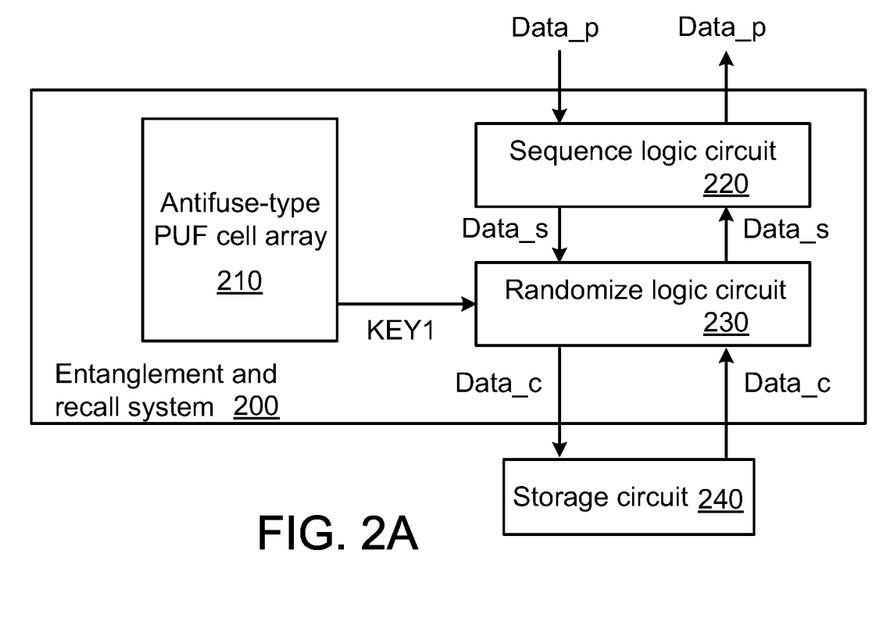
FIG. 2A is a schematic block diagram illustrating the architecture of an entanglement and recall system according to a first embodiment of the present invention.

FIG. 2A is a schematic block diagram illustrating the architecture of an entanglement and recall system according to a first embodiment of the present invention. The entanglement and recall system 200 is installed in an IC chip. The entanglement and recall system 200 comprises an antifuse-type PUF cell array 210 and a processing circuit. The processing circuit comprises a sequence logic circuit 220 and a randomize logic circuit 230.

While an entanglement action and a recall action are performed, the antifuse-type PUF cell array 210 issues a first key KEY1 to the randomize logic circuit 230.

While the entanglement action is performed, the sequence logic circuit 220 receives a plain text Data_p. After a sequence adjusting process, the sequence logic circuit 220 generates a first data Data_s. Then, the randomize logic circuit 230 receives the first data Data_s and the first key KEY1 and generates a cipher text Data_c. The cipher text Data_c can be stored in a storage circuit 240.

While the recall action is performed, the randomize logic circuit 230 receives the cipher text Data_c and the first key KEY1 and generates the first data Data_s. Then, the sequence logic circuit 220 receives the first data Data_s. After a sequence reversing process, the sequence logic circuit 220 generates the plain text Data_p.

In this embodiment, the sequence logic circuit 220 performs the sequence adjusting process and the sequence reversing process in a symmetric swapping manner.

Figure 2B:
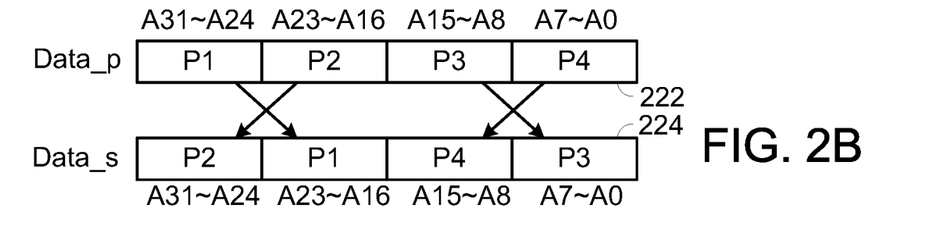
FIGS. 2B and 2C schematically illustrate an example of the sequence adjusting process and the sequence reversing process performed by the sequence logic circuit of the entanglement and recall system according to the first embodiment of the present invention.
Figure 2C:
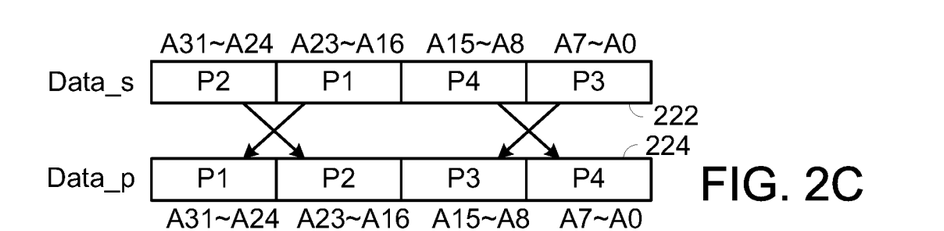

FIG. 2B schematically illustrates an example of the sequence adjusting process performed by the sequence logic circuit of the entanglement and recall system according to the first embodiment of the present invention. FIG. 2C schematically illustrates an example of the sequence reversing process performed by the sequence logic circuit of the entanglement and recall system according to the first embodiment of the present invention.

Please refer to FIG. 2B. The sequence logic circuit 220 comprises two registers 222 and 224. The register 222 receives the plain text Data_p. The plain text Data_p is divided into four parts P1~P4. For example, the plain text Data_p has 32 bits in size. In addition, the plain text Data_p is divided into 4 bytes. The content of the first part P1 of the plain text is recorded in the addresses A31~A24 of the register 222. The content of the second part P2 of the plain text is recorded in the addresses A23~A16 of the register 222. The content of the third part P3 of the plain text is recorded in the addresses A15~A8 of the register 222. The content of the fourth part P4 of the plain text is recorded in the addresses A7~A0 of the register 222.

While the sequence logic circuit 220 performs the sequence adjusting process, the first part P1 and the second part P2 are exchanged with each other and the third part P3 and the fourth part P4 are exchanged with each other. Consequently, the first data Data_s is generated and stored in the register 224. After the sequence adjusting process is completed, the content of the second part P2 of the plain text is recorded in the addresses A31~A24 of the register 224, the content of the first part P1 of the plain text is recorded in the addresses A23~A16 of the register 224, the content of the fourth part P4 of the plain text is recorded in the addresses A15~A8 of the register 224, and the content of the third part P3 of the plain text is recorded in the addresses A7~A0 of the register 224.

Please refer to FIG. 2C. The register 222 receives the first data Data_s. The first data Data_s contains the second part P2, the first part P1, the fourth part P4 and the third part P3 of the plain text sequentially. That is, the content of the second part P2 of the plain text is recorded in the addresses A31~A24 of the register 224, the content of the first part P1 of the plain text is recorded in the addresses A23~A16 of the register 224, the content of the fourth part P4 of the plain text is recorded in the addresses A15~A8 of the register 224, and the content of the third part P3 of the plain text is recorded in the addresses A7~A0 of the register 224.

While the sequence logic circuit 220 performs the sequence reversing process, the second part P2 and the first part P1 are exchanged with each other and the fourth part P4 and the third part P3 are exchanged with each other. Consequently, the plain text Data_p is generated and stored in the register 224. After the sequence reversing process is completed, the content of the first part P1 of the plain text is recorded in the addresses A31~A24 of the register 224, the content of the second part P2 of the plain text is recorded in the addresses A23~A16 of the register 224, the content of the third part P3 of the plain text is recorded in the addresses A15~A8 of the register 224, and the content of the fourth part P4 of the plain text is recorded in the addresses and A7~A0 of the register 224. Consequently, after the sequence reversing process is completed, the first data Data_s is restored to the plain text Data_p.

As mentioned above, during the sequence adjusting process, the first byte and the second byte are exchanged and the third byte and the fourth byte are exchanged. After the sequence adjusting process is completed, the first data Data_s contains the second byte, the first byte, the fourth byte and the third byte of the plain text sequentially. Moreover, after the sequence reversing process is completed, the first data Data_s is restored to the plain text Data_p.

The examples of the sequence adjusting process and the sequence reversing process are not restricted. That is, other examples of the sequence adjusting process and the sequence reversing process in the symmetric swapping manner are feasible. For example, in another embodiment, the plain text Data_p is also divided into the four parts P1~P4. While the sequence adjusting process is performed, the fourth part P4 and the first part P1 are exchanged with each other and the third part P3 and the second part P2 are exchanged with each other. Consequently, the first data Data_s is generated. Similarly, after the sequence reversing process is completed, the first data Data_s is restored to the plain text Data_p.

Figure 2D:
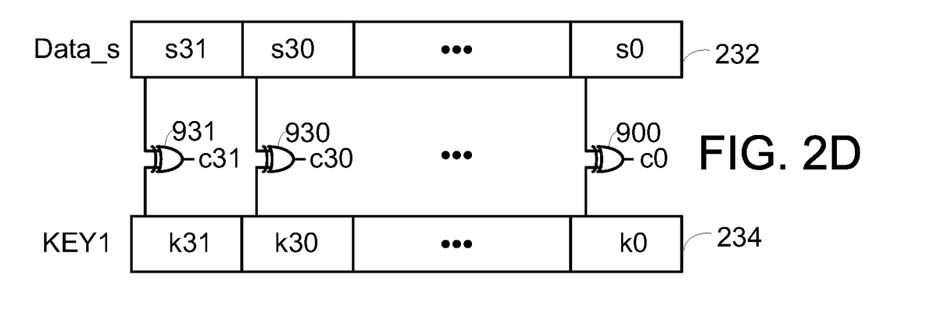
FIGS. 2D and 2E are schematic circuit diagrams illustrating the operations of the randomize logic circuit of the entanglement and recall system according to the first embodiment of the present invention.
Figure 2E:
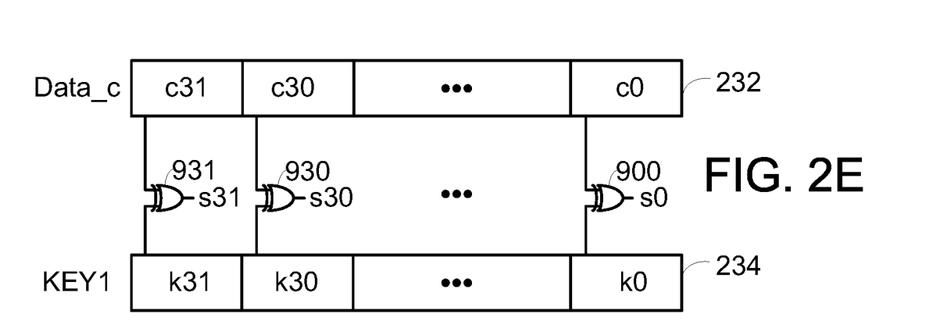

FIGS. 2D and 2E are schematic circuit diagrams illustrating the operations of the randomize logic circuit of the entanglement and recall system according to the first embodiment of the present invention. The randomize logic circuit 230 comprises two registers 232, 234 and plural XOR gates 900~931. After the randomize logic circuit 230 performs an XOR operation on the first data Data_s and the first key KEY1, the cipher text Data_c is generated.

As shown in FIG. 2D, the register 232 receives the first data Data_s with 32 bits s31~s0, and the register 234 receives the first key KEY1 with 32 bits k31~k0. After the XOR operation is performed on the bit s0 of the first data Data_s and the bit k0 of the first key KEY1 by the XOR gate 900, the bit c0 of the cipher text Data_c is generated. After the above process is repeatedly done, the other bits c31~c1 of the cipher text Data_c are generated.

After the randomize logic circuit 230 performs an XOR operation on the cipher text Data_c and the first key KEY1, the first data Data_s is generated. As shown in FIG. 2E, the register 232 receives the cipher text Data_c with 32 bits c31~c0, and the register 234 receives the first key KEY1 with 32 bits k31~k0. After the XOR operation is performed on the bit c0 of the cipher text Data_c and the bit k0 of the first key KEY1 by the XOR gate 900, the bit s0 of the first data Data_s is generated. After the above process is repeatedly done, the other bits s31~s1 of the first data Data_s are generated.

It is noted that entanglement and recall system 200 may be modified by the one skilled in the art. In another embodiment, the randomize logic circuit 230 receives the plain text and generates the first data according to the plain text and the first key KEY1 while the entanglement action is performed. After a sequence adjusting process is performed, the sequence logic circuit 220 generates the cipher text. While the recall action is performed, the sequence logic circuit 220 performs a sequence reversing process to generate the first data. Then, the randomize logic circuit 230 receives the first data and the first key KEY1 and generates the plain text.

Figure 3A:
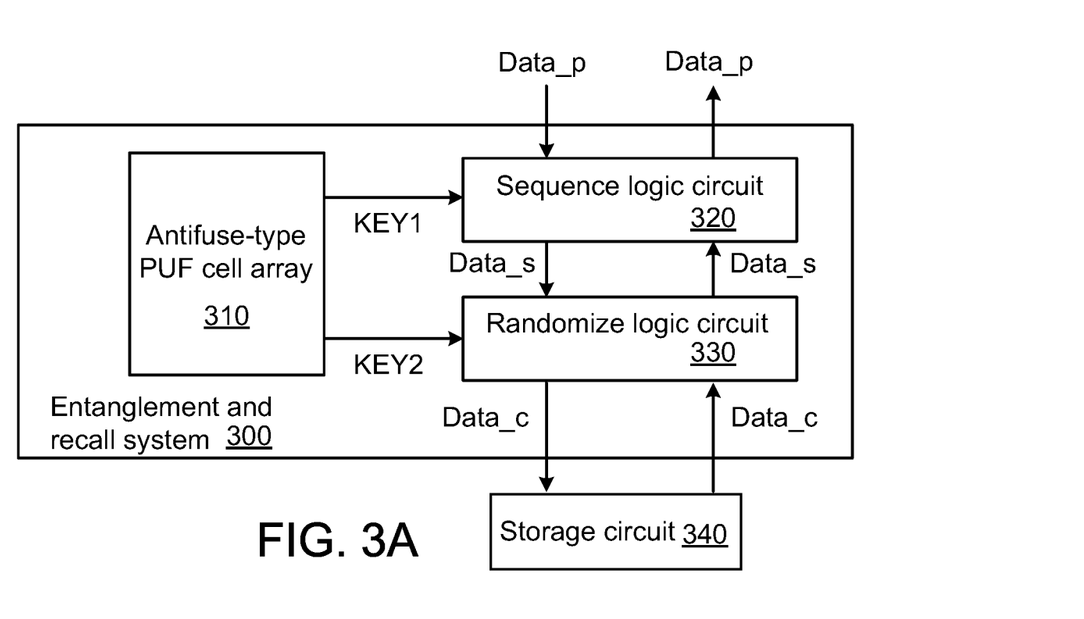
FIG. 3A is a schematic block diagram illustrating the architecture of an entanglement and recall system according to a second embodiment of the present invention.

FIG. 3A is a schematic block diagram illustrating the architecture of an entanglement and recall system according to a second embodiment of the present invention. The entanglement and recall system 300 is installed in an IC chip. The entanglement and recall system 300 comprises an antifuse-type PUF cell array 310 and a processing circuit. The processing circuit comprises a sequence logic circuit 320 and a randomize logic circuit 330.

While an entanglement action and a recall action are performed, the antifuse-type PUF cell array 310 issues a first key KEY1 and a second key KEY2 to the sequence logic circuit 320 and the randomize logic circuit 330, respectively.

While the entanglement action is performed, the sequence logic circuit 320 receives a plain text Data_p and the first key KEY1. After a sequence adjusting process, the sequence logic circuit 320 generates a first data Data_s. Then, the randomize logic circuit 330 receives the first data Data_s and the second key KEY2 and generates a cipher text Data_c. The cipher text Data_c can be stored in a storage circuit 340.

While the recall action is performed, the randomize logic circuit 330 receives the cipher text Data_c and the second key KEY2 and generates the first data Data_s. Then, the sequence logic circuit 320 receives the first data Data_s and the first key KEY1. After a sequence reversing process, the sequence logic circuit 320 generates the plain text Data_p.

In comparison with the first embodiment, the sequence logic circuit 320 performs the sequence adjusting process and the sequence reversing process in an asymmetric swapping manner or a symmetric swapping manner. For succinctness, only the operations of the sequence logic circuit 320 will be described as follows. The operations of the other circuits are not redundantly described herein.

Figure 3B:
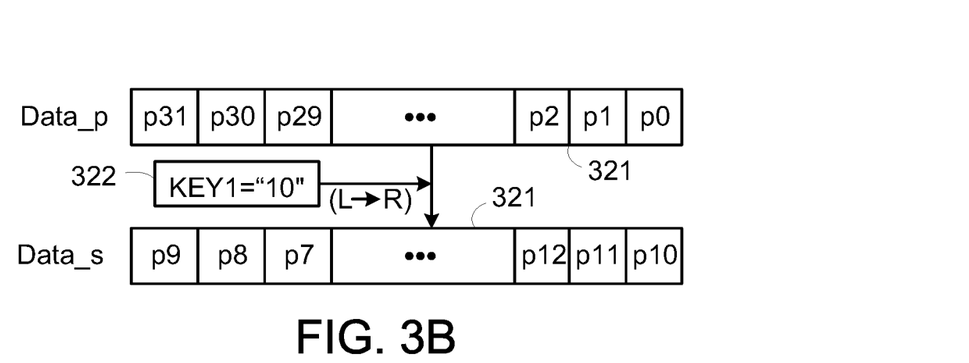
FIGS. 3B and 3C schematically illustrate an example of the sequence adjusting process and the sequence reversing process performed by the sequence logic circuit of the entanglement and recall system according to the second embodiment of the present invention.
Figure 3C:
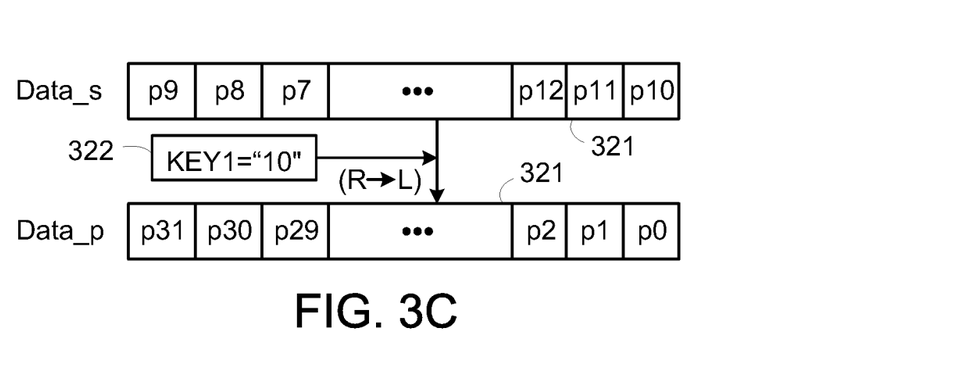

FIG. 3B schematically illustrates an example of the sequence adjusting process performed by the sequence logic circuit of the entanglement and recall system according to the second embodiment of the present invention and in an asymmetric swapping manner. FIG. 3C schematically illustrates an example of the sequence reversing process performed by the sequence logic circuit of the entanglement and recall system according to the second embodiment of the present invention and in the asymmetric swapping manner.

Please refer to FIG. 3B. The sequence logic circuit 320 comprises two registers 321 and 322. The register 321 is a circular shift register. The register 321 receives the plain text Data_p with 32 bits p31~p0. The register 322 receives the first key KEY1 with 32 bits. While the sequence logic circuit 320 performs the sequence adjusting process, the bits in the register 321 are shifted rightwards. That is, the bits in the register 321 are shifted from left to right (L→R). The number of bits to be shifted rightwards is determined according to the value of the first key KEY1.

While the sequence logic circuit 320 performs the sequence reversing process, the bits in the register 321 are shifted leftwards. That, the bits in the register 321 are shifted from right to left (R→L). The number of bits to be shifted leftwards is determined according to the value of the first key KEY1.

Please refer to FIG. 3B. The register 321 receives the plain text Data_p. For example, the value of the first key KEY1 is "10". That is, the number of bits to be shifted rightwards is 10. After the sequence logic circuit 320 performs the sequence adjusting process, the bit p9 of the plain text Data_p becomes the most significant bit (MSB) of the first data Data_s and the bit p9 becomes the least significant bit (LSB) of the first data Data_s.

Please refer to FIG. 3C. The register 322 receives the first data Data_s. Similarly, the value of the first key KEY1 is "10". After the sequence reversing process is completed, the first data Data_s in the register 321 is restored to the plain text Data_p according to the first key KEY1.

Figure 3D:
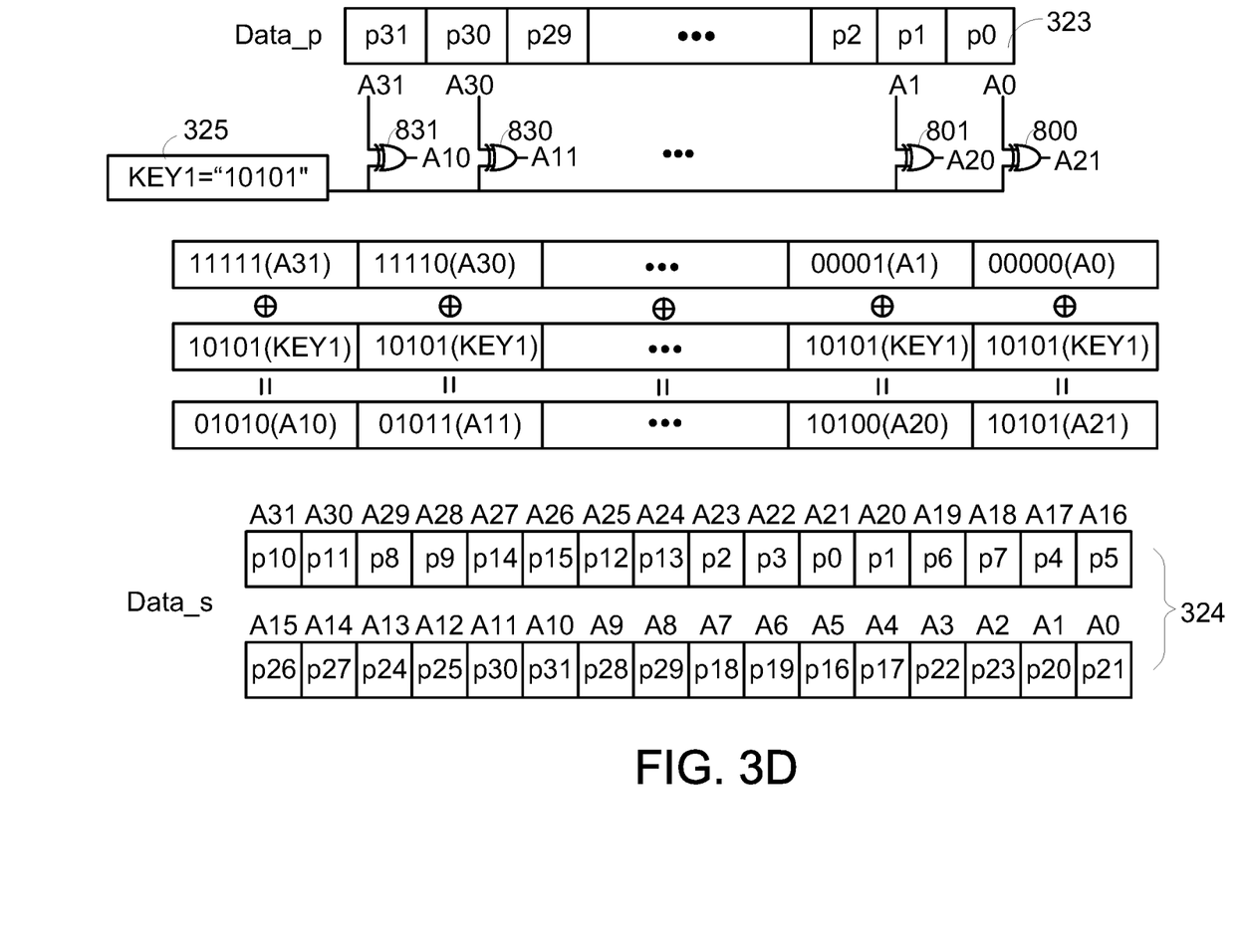
FIGS. 3D and 3E schematically illustrate another example of the sequence adjusting process and the sequence reversing process performed by the sequence logic circuit of the entanglement and recall system according to the second embodiment of the present invention.
Figure 3E:
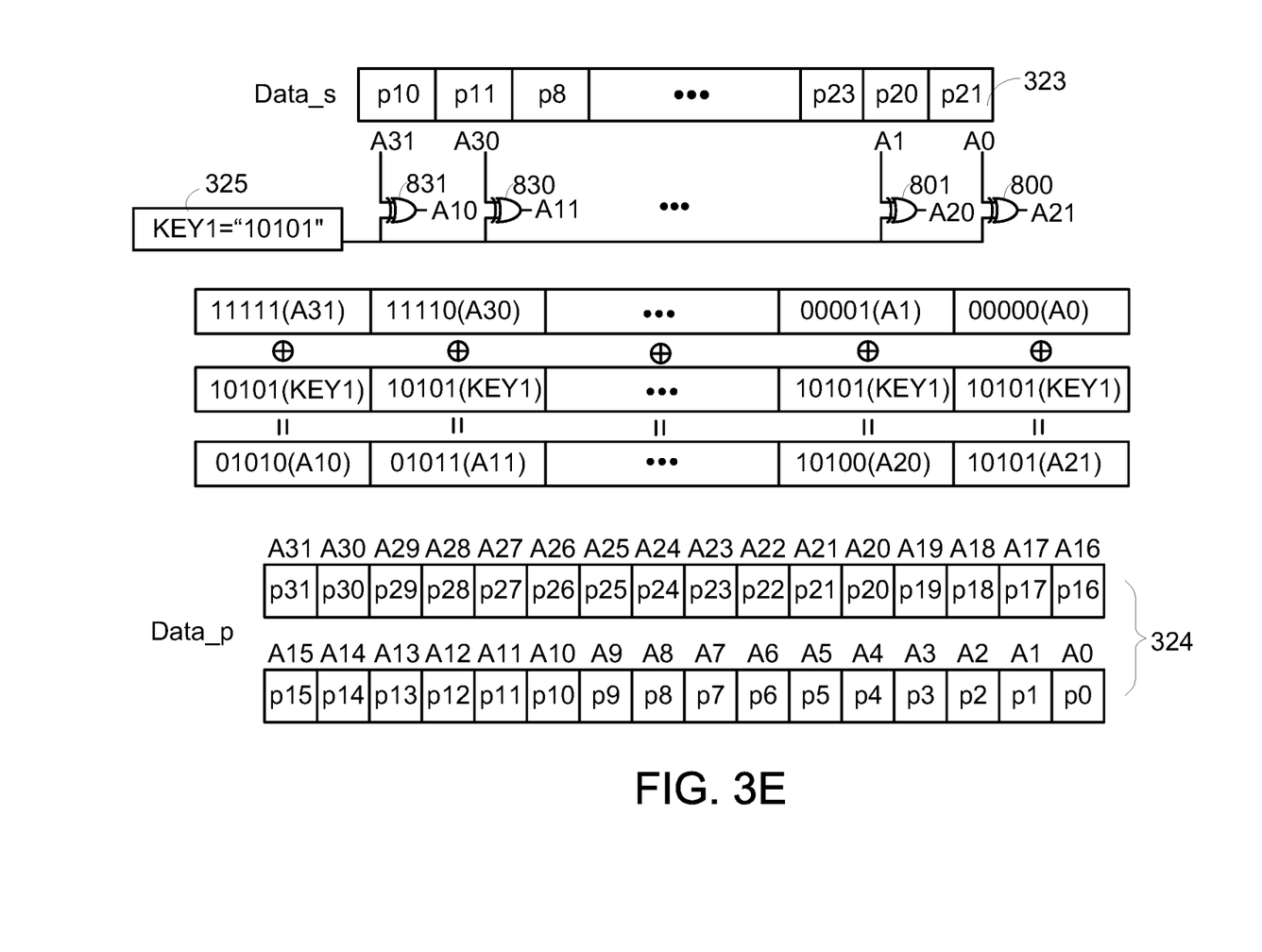

FIGS. 3D and 3E are schematic circuit diagrams illustrating the operations of the sequence logic circuit of the entanglement and recall system according to the second embodiment of the present invention and in the asymmetric swapping manner. The sequence logic circuit 320 comprises three registers 323, 324, 325 and plural XOR gates 800~831.

While the sequence logic circuit 320 performs the sequence adjusting process, the register 323 receives the plain text Data_p with 32 bits p31~p0 and the register 325 receives the first key KEY1. After an XOR operation is performed on the addresses A31~A0 of the register 323 and the first key KEY1, new addresses are generated. Then, the sequence logic circuit 320 adjusts the sequence of the bits of the plain text Data_p.

While the sequence logic circuit 320 performs the sequence reversing process, the register 323 receives the first data Data_s and the register 325 receives the first key KEY1. After an XOR operation is performed on the addresses A31~A0 of the register 323 and the first key KEY1, new addresses are generated. Then, the sequence logic circuit 320 adjusts the sequence of the bits of the first data Data_s and stores the updated contents of the first data Data_s into the register 324. Consequently, the contents in the register 324 are restored to the plain text Data_p.

Assuming that the first key KEY1 is "10101", the sequence adjusting process and the sequence reversing process will be described as follows.

Please refer to FIG. 3D. While the sequence adjusting process is performed, the register 323 receives the plain text Data_p. After an XOR operation is performed on the addresses A31~A0 of the register 323 and the first key KEY1, new addresses are generated.

For example, after the XOR operation is performed on the address A31 ("11111") and the key KEY1 ("10101"), the new address is A10 ("01010"). Consequently, the content p31 in the address A31 of the register 323 is stored in the address A10 of the register 424. Similarly, after the XOR operation is performed on the address A30 ("11110") and the key KEY1 ("10101"), the new address is A11 ("01011"). Consequently, the content p30 in the address A30 of the register 323 is stored in the address A11 of the register 424. Similarly, after the XOR operation is performed on the address A1 ("00001") and the key KEY1 ("10101"), the new address is A20 ("10100"). Consequently, the content p1 in the address A1 of the register 323 is stored in the address A20 of the register 424. Similarly, after the XOR operation is performed on the address A0 ("00000") and the key KEY1 ("10101"), the new address is A21 ("10101"). Consequently, the content p0 in the address A0 of the register 323 is stored in the address A21 of the register 424.

After the sequence adjusting process is completed, the contents in the register 324 are the first data Data_s. That is, the contents stored in the addresses A31~A0 of the register 324 include p10, p11, p8, p9, p14, p15, p12, p13, p2, p3, p0, p1, p26, p27, p24, p25, p30, p31, p28, p29, p18, p19, p16, p17, p22, p23, p20 and p21 sequentially.

Please refer to FIG. 3E. While the sequence reversing process is performed, the register 323 receives the first data Data_s. After an XOR operation is performed on the addresses A31~A0 of the register 323 and the first key KEY1, new addresses are generated.

For example, after the XOR operation is performed on the address A31 ("11111") and the key KEY1 ("10101"), the new address is A10 ("01010"). Consequently, the content p10 in the address A31 of the register 323 is stored in the address A10 of the register 424. Similarly, after the XOR operation is performed on the address A30 ("11110") and the key KEY1 ("10101"), the new address is A11 ("01011"). Consequently, the content p11 in the address A30 of the register 323 is stored in the address A11 of the register 424. Similarly, after the XOR operation is performed on the address A1 ("00001") and the key KEY1 ("10101"), the new address is A20 ("10100"). Consequently, the content p20 in the address A1 of the register 323 is stored in the address A20 of the register 424. Similarly, after the XOR operation is performed on the address A0 ("00000") and the key KEY1 ("10101"), the new address is A21 ("10101"). Consequently, the content p21 in the address A0 of the register 323 is stored in the address A21 of the register 424.

After the sequence reversing process is completed, the contents in the register 324 are the plain text Data_p. That is, the contents stored in the addresses A31~A0 of the register 324 include p31~p0, respectively.

The examples of the sequence adjusting process and the sequence reversing process are presented herein for purpose of illustration and description only. In some other embodiments, the sequence adjusting process and the sequence reversing process are performed in both of the symmetric swapping manner and the asymmetric swapping manner.

Figure 3F:
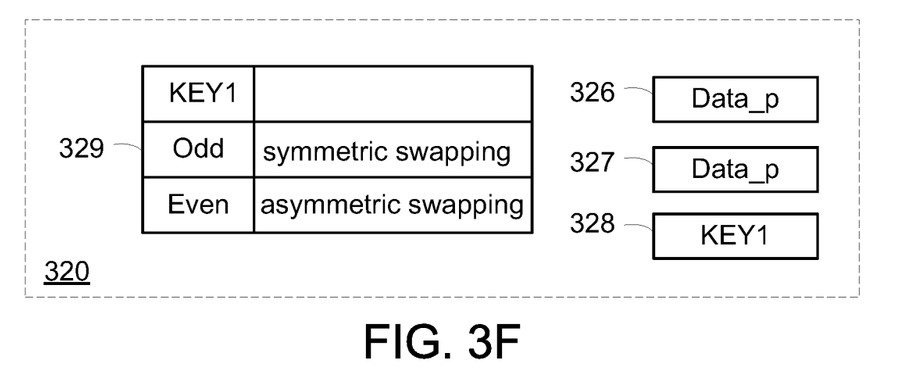
FIG. 3F schematically illustrates a further example of the sequence adjusting process and the sequence reversing process performed by the sequence logic circuit of the entanglement and recall system according to the second embodiment of the present invention.

FIG. 3F schematically illustrates another example of the sequence adjusting process and the sequence reversing process performed by the sequence logic circuit of the entanglement and recall system according to the second embodiment of the present invention. As shown in FIG. 3F, the sequence logic circuit 320 comprises three registers 326, 327, 328 and a look-up table 329. The register 326 receives the plain text Data_p. The register 328 receives the first key KEY1. The register 327 receives the first data Data_s. Moreover, the operation modes of the sequence logic circuit 320 are recorded in the look-up table 329.

According to the contents of the look-up table 329, the odd value of the first key KEY1 corresponds to the symmetric swapping manner and the even value of the first key KEY1 corresponds to the asymmetric swapping manner. If the value of the first key KEY1 is odd, the sequence adjusting process and the sequence reversing process as described in FIGS. 3D and 3E are performed by the sequence logic circuit 320 in the symmetric swapping manner. Whereas, if the value of the first key KEY1 is even, the sequence adjusting process and the sequence reversing process as described in FIGS. 3A and 3B are performed by the sequence logic circuit 320 in the asymmetric swapping manner.

It is noted that the number of operations modes of the sequence logic circuit 320 recorded in the look-up table 329 is not restricted to 2. It is noted that the contents of the look-up table 329 may contain more operation modes of the sequence logic circuit 320.

The entanglement and recall system 300 of the second embodiment may be modified. In another embodiment, the randomize logic circuit 330 receives the plain text and generates the first data according to the plain text and the first key KEY1 while the entanglement action is performed. After a sequence adjusting process is performed, the sequence logic circuit 320 generates the cipher text. While the recall action is performed, the sequence logic circuit 320 performs a sequence reversing process according to the second key KEY2 to generate the first data. Then, the randomize logic circuit 330 receives the first data and the first key KEY1 and generates the plain text.

Figure 4A:
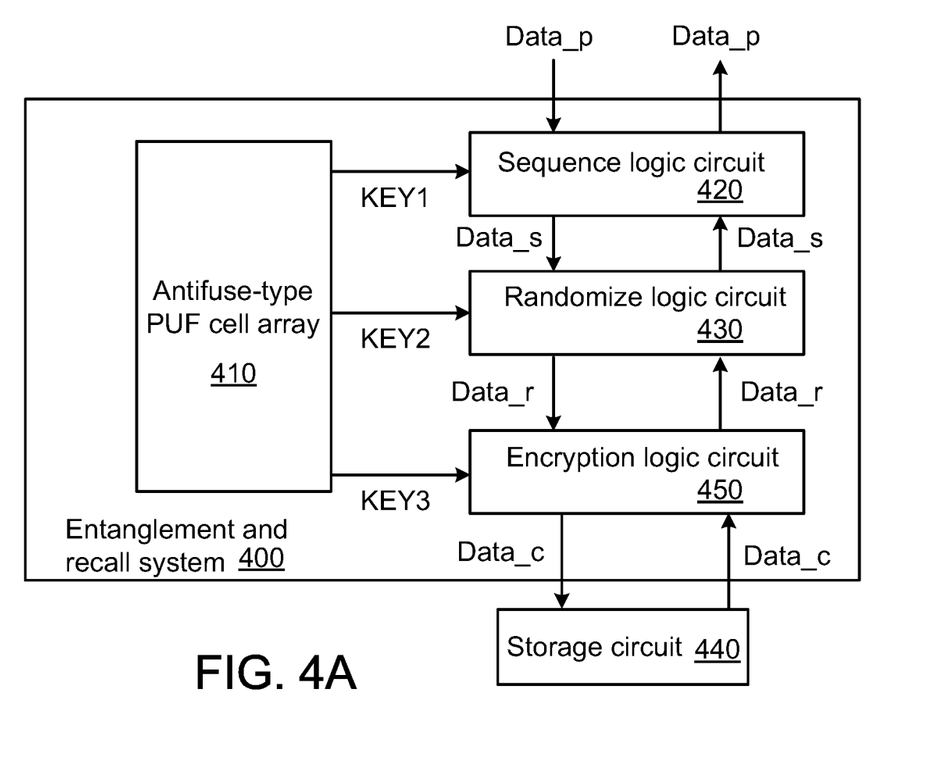
FIG. 4A is a schematic block diagram illustrating the architecture of an entanglement and recall system according to a third embodiment of the present invention.

FIG. 4A is a schematic block diagram illustrating the architecture of an entanglement and recall system according to a third embodiment of the present invention. The entanglement and recall system 400 is installed in an IC chip. The entanglement and recall system 400 comprises an antifuse-type PUF cell array 410 and a processing circuit. The processing circuit comprises a sequence logic circuit 420, a randomize logic circuit 430 and an encryption logic circuit 450.

While an entanglement action and a recall action are performed, the antifuse-type PUF cell array 410 issues a first key KEY1, a second key KEY2 and a third key KEY3 to the sequence logic circuit 420, the randomize logic circuit 430 and the encryption logic circuit 450, respectively.

While the entanglement action is performed, the sequence logic circuit 420 receives a plain text Data_p and the first key KEY1. After a sequence adjusting process, the sequence logic circuit 420 generates a first data Data_s. Then, the randomize logic circuit 430 receives the first data Data_s and the second key KEY2 and generates a second data Data_r. Then, the encryption logic circuit 450 receives the second data Data_r and the third key KEY3 and generates a cipher text Data_c. The cipher text Data_c can be stored in a storage circuit 440.

While the recall action is performed, the encryption logic circuit 450 receives the cipher text Data_c and the third key KEY3 and generates the second data Data_r. Then, the randomize logic circuit 430 receives the second data Data_r and the second key KEY2 and generates the first data Data_s. Then, the sequence logic circuit 420 receives the first data Data_s and the first key KEY1. After a sequence reversing process, the sequence logic circuit 420 generates the plain text Data_p.

The operations of the sequence logic circuit 420 and the randomize logic circuit 430 of the third embodiment are similar to those of the second embodiment, and are not redundantly described herein. For succinctness, only the encryption logic circuit 450 will be described as follows.

Figure 4B:
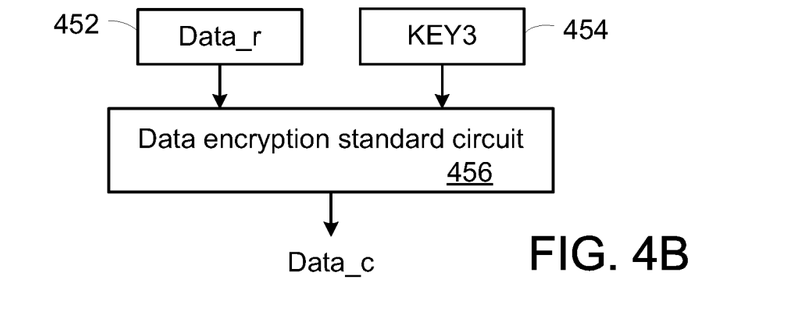
FIGS. 4B and 4C schematically illustrate an example of an encryption process and a decryption process performed by the encryption logic circuit of the entanglement and recall system according to the third embodiment of the present invention.
Figure 4C:
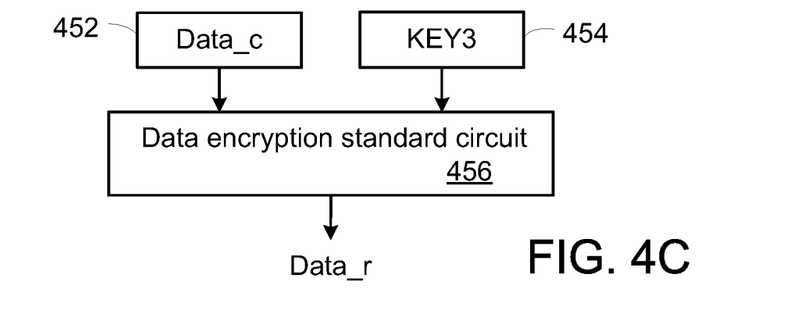

FIGS. 4B and 4C schematically illustrate an example of an encryption process and a decryption process performed by the encryption logic circuit of the entanglement and recall system according to the third embodiment of the present invention.

Please refer to FIG. 4B. The encryption logic circuit 450 comprises two registers 452, 454 and a data encryption standard circuit (DES) 456. The register 452 receives the second data Data_r. The register 454 receives the third key KEY3. While the encryption logic circuit 450 performs an encryption process, the data encryption standard circuit 456 receives the second data Data_r and the third key KEY3 and generates the cipher text Data_c.

Please refer to FIG. 4C. The register 452 receives the cipher text Data_c. The register 454 receives the third key KEY3. While the decryption logic circuit 450 performs a decryption process, the data encryption standard circuit 456 receives the cipher text Data_c and the third key KEY3 and generates the second data Data_r.

Figure 4D:
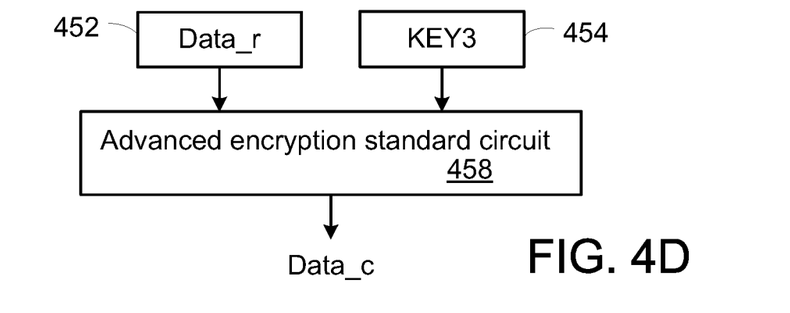
FIGS. 4D and 4E schematically illustrate another example of an encryption process and a decryption process performed by the encryption logic circuit of the entanglement and recall system according to the third embodiment of the present invention.
Figure 4E:
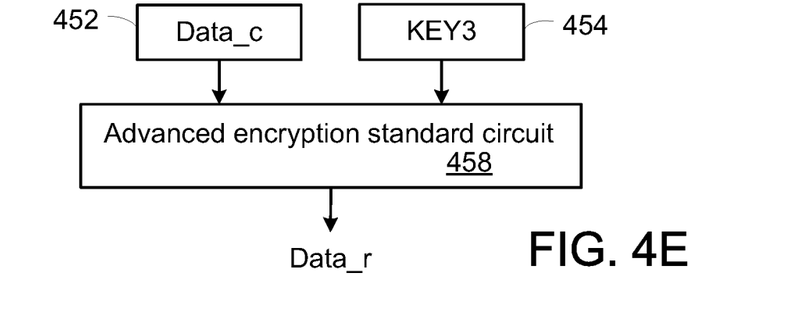

The encryption process and the decryption process are presented herein for purpose of illustration and description only. It is noted that the encryption process and the decryption process may be modified. FIGS. 4D and 4E schematically illustrate another example of an encryption process and a decryption process performed by the encryption logic circuit of the entanglement and recall system according to the third embodiment of the present invention.

Please refer to FIG. 4D. The encryption logic circuit 450 comprises two registers 452, 454 and an advanced encryption standard circuit (AES) 458. The register 452 receives the second data Data_r. The register 454 receives the third key KEY3. While the encryption logic circuit 450 performs the encryption process, the advanced encryption standard circuit 458 receives the second data Data_r and the third key KEY3 and generates the cipher text Data_c.

Please refer to FIG. 4E. The register 452 receives the cipher text Data_c. The register 454 receives the third key KEY3. While the decryption logic circuit 450 performs the decryption process, the advanced encryption standard circuit 458 receives the cipher text Data_c and the third key KEY3 and generates the second data Data_r.

In this embodiment, the sequence logic circuit 420 performs the sequence adjusting process and the sequence reversing process in an asymmetric swapping manner. Alternatively, the sequence logic circuit 420 performs the sequence adjusting process and the sequence reversing process in a symmetric swapping manner. Under this circumstance, the sequence logic circuit 420 does not receive the first key KEY1.

The sequence of the actions performed by the sequence logic circuit 420, the randomize logic circuit 430 and the encryption logic circuit 450 may be varied according to the practical requirements. In this embodiment, the randomize logic circuit 430 and the encryption logic circuit 450 have the functions of randomizing the received data. Consequently, the encryption logic circuit 450 may be considered as another randomize logic circuit.

From the above descriptions, the present invention provides an entanglement and recall system using a PUF technology. The antifuse-type PUF cell array of the entanglement and recall system can provide the unpredictable and unique key to the processing circuit. According to the key, the plain text is converted into the cipher text by the processing circuit. Since the external device cannot realize the generated key of the antifuse-type PUF cell array, the cipher text cannot be cracked.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An entanglement and recall system, comprising:
an antifuse-type PUF cell array generating a first key and a second key; and
a processing circuit connected with the antifuse-type PUF cell array to receive the first key and the second key, wherein the processing circuit comprises: a sequence logic circuit, a randomize logic circuit connected with the antifuse-type PUF cell array and the sequence logic circuit, and an encryption logic circuit connected with the antifuse-type PUF cell array and the randomize logic circuit;
wherein while an entanglement action is performed, the sequence logic circuit receives a plain text and performs a sequence adjusting process to generate a first data, the randomize logic circuit receives the first data and the first key and generates a second data according to the first data and the first key, and the encryption logic circuit receives the second data and the second key and performs an encryption process to generate a cipher text, wherein while a recall action is performed, the encryption logic circuit receives the cipher text and the second key and performs a decryption process to generate the second data, the randomize logic circuit receives the second data and the first key and generates the first data according to the second data and the first key, and the sequence logic circuit receives the first data and performs a sequence reversing process to generate the plain text.

2. The entanglement and recall system as claimed in claim 1, wherein antifuse-type PUF cell array is an enrolled antifuse-type one time programming cell array.

3. The entanglement and recall system as claimed in claim 1, wherein the entanglement and recall system further comprises a storage circuit, and the cipher text is stored in the storage circuit.

4. The entanglement and recall system as claimed in claim 1, wherein the encryption logic circuit comprises a data encryption standard circuit, wherein the data encryption standard circuit receives the second key from the antifuse-type PUF cell array and selectively performs an encryption process or a decryption process.

5. The entanglement and recall system as claimed in claim 1, wherein the encryption logic circuit comprises an advanced encryption standard circuit, wherein the advanced encryption standard circuit receives the second key from the antifuse-type PUF cell array and selectively performs an encryption process or a decryption process.

6. An entanglement and recall system comprising:
an antifuse-type PUF cell array generating a first key and a second key; and
a processing circuit connected with the antifuse-type PUF cell array to receive the first key and the second key, wherein the processing circuit comprises: an encryption logic circuit connected with the antifuse-type PUF cell array, a randomize logic circuit connected with the antifuse-type PUF cell array and the encryption logic circuit, and a sequence logic circuit connected with the randomize logic circuit;
wherein while an entanglement action is performed, the encryption logic circuit receives a plain text and the first key and performs an encryption process to generate a first data, the randomize logic circuit receives the first data and the second key and generates a second data according to the first data and the second key, and the sequence logic circuit receives the second data and performs a sequence adjusting process to generate a cipher text,
wherein while a recall action is performed, the sequence logic circuit receives the cipher text and performs a sequence reversing process to generate the second data, the randomize logic circuit receives the second data and the second key and generates the first data according to the second data and the second key, and the encryption logic circuit receives the first data and the first key and performs a decryption process to generate the plain text.

7. An entanglement and recall system comprising:
an antifuse-type PUF cell array generating a first key and a second key; and
a processing circuit connected with the antifuse-type PUF cell array to receive the first key and the second key, wherein the processing circuit comprises: a randomize logic circuit connected with the antifuse-type PUF cell array, a sequence logic circuit connected with the randomize logic circuit, and an encryption logic circuit connected with the antifuse-type PUF cell array and the sequence logic circuit;
wherein while an entanglement action is performed, the randomize logic circuit receives a plain text and the first key and generates a first data according to the plain text and the first key, the sequence logic circuit receives the first data and performs a sequence adjusting process to generate a second data, and the encryption logic circuit receives the second data and the second key and performs an encryption process to generate a cipher text,
wherein while a recall action is performed, the encryption logic circuit receives the cipher text and the second key and performs a decryption process to generate the second data, the sequence logic circuit receives the second data and performs a sequence reversing process to generate the first data, and the randomize logic circuit receives the first data and the first key and generates the plain text according to the first data and the first key.

8. An entanglement and recall system comprising:
an antifuse-type PUF cell array generating a first key and a second key; and
a processing circuit connected with the antifuse-type PUF cell array to receive the first key and the second key, wherein the processing circuit comprises: an encryption logic circuit connected with the antifuse-type PUF cell array, a sequence logic circuit connected with the encryption logic circuit, and a randomize logic circuit connected with the antifuse-type PUF cell array and the sequence logic circuit;
wherein while an entanglement action is performed, the encryption logic circuit receives a plain text and the first key and performs an encryption process to generate a first data, the sequence logic circuit receives the first data and performs a sequence adjusting process to generate a second data, and the randomize logic circuit receives the second data and the second key and generates a cipher text according to the second data and the second key,
wherein while a recall action is performed, the randomize logic circuit receives the cipher text and the second key and generates the second data according to the cipher text and the second key, the sequence logic circuit receives the second data and performs a sequence reversing process to generate the first data, and the encryption logic circuit receives the first data and the first key and performs a decryption process to generate the plain text.

9. An entanglement and recall system comprising:
an antifuse-type PUF cell array generating a first key and a second key; and
a processing circuit connected with the antifuse-type PUF cell array to receive the first key and the second key, wherein the processing circuit comprises: a randomize logic circuit connected with the antifuse-type PUF cell array, an encryption logic circuit connected with the antifuse-type PUF cell array and the randomize logic circuit, and a sequence logic circuit connected with the encryption logic circuit;
wherein while an entanglement action is performed, the randomize logic circuit receives a plain text and the first key and generates a first data according to the plain text and the first key, the encryption logic circuit receives the first data and the second key and performs an encryption process to generate a second data, and the sequence logic circuit receives the second data and performs a sequence adjusting process to generate a cipher text, wherein while a recall action is performed, the sequence logic circuit receives the cipher text and performs a sequence reversing process to generate the second data, the encryption logic circuit receives the second data and the second key and performs a decryption process to generate the first data, and the randomize logic circuit receives the first data and the first key and generates the plain text according to the first data and the first key.

10. An entanglement and recall system comprising:

an antifuse-type PUF cell array generating a first key and a second key; and a processing circuit connected with the antifuse-type PUF cell array to receive the first key and the second key, wherein the processing circuit comprises: a sequence logic circuit, an encryption logic circuit connected with the antifuse-type PUF cell array and the sequence logic circuit, and a randomize logic circuit connected with the antifuse-type PUF cell array and the encryption logic circuit;

wherein while an entanglement action is performed, the sequence logic circuit receives a plain text and performs a sequence adjusting process to generate a first data, the encryption logic circuit receives the first data and the first key and performs an encryption process to generate a second data, and the randomize logic circuit receives the second data and the second key and generates g cipher text according to the second data and the second key, wherein while a recall action is performed, the randomize logic circuit receives the cipher text and the second key and generates the second data according to the cipher text and the second key, the encryption logic circuit receives the second data and the first key and performs a decryption process to generate the first data, and the sequence logic circuit receives the first data and performs a sequence reversing process to generate the plain text.

* * * * *